United States Patent
Kuboshima et al.

(10) Patent No.: US 7,051,519 B2
(45) Date of Patent: May 30, 2006

(54) EXHAUST GAS CLEANING DEVICE FOR INTERNAL COMBUSTION ENGINE

(75) Inventors: Tsukasa Kuboshima, Kariya (JP); Kanehito Nakamura, Kariya (JP); Makoto Saito, Kariya (JP); Shigeto Yahata, Kariya (JP); Kazuharu Tochikawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/183,961

(22) Filed: Jul. 19, 2005

(65) Prior Publication Data

US 2006/0021334 A1 Feb. 2, 2006

(30) Foreign Application Priority Data

Jul. 30, 2004 (JP) .............................. 2004-222873
Apr. 18, 2005 (JP) .............................. 2005-119689

(51) Int. Cl.
*F01N 3/00* (2006.01)

(52) U.S. Cl. .............................. 60/286; 60/295; 60/297

(58) Field of Classification Search .................. 60/286, 60/295, 297
See application file for complete search history.

(56) References Cited

U.S. PATENT DOCUMENTS

| 4,902,487 A | 2/1990 | Cooper et al. |
| 2001/0010151 A1* | 8/2001 | Russell .................. 60/286 |
| 2005/0022520 A1* | 2/2005 | Shirakawa et al. ............ 60/297 |

FOREIGN PATENT DOCUMENTS

JP 2001-280118 10/2001

* cited by examiner

*Primary Examiner*—Thomas Denion
*Assistant Examiner*—Marc I. Nagy
(74) *Attorney, Agent, or Firm*—Nixon & Vanderhye P.C.

(57) ABSTRACT

The amount of accumulated particulate matter, which is accumulated in a particulate filter, is computed based on the amount of exhausted particulate matter, which is exhausted from an engine, and the amount of reduced particulate matter, which is reduced in the filter. The amount of reduced particulate matter includes the amount of reduced particulate matter, which is reduced through oxidizing reaction of the accumulated particulate matter with $NO_2$. At the time of computing this amount, reduction of the particulate matter through oxidizing reaction with adsorbed $NO_2$, which is adsorbed by the accumulated particulate matter, is concerned in addition to reduction of the particulate matter through oxidizing reaction with $NO_2$, which is present in the surrounding atmosphere around the accumulated particulate matter.

3 Claims, 6 Drawing Sheets

EXHAUST GAS CLEANING DEVICE FOR INTERNAL COMBUSTION ENGINE

CROSS REFERENCE TO RELATED APPLICATION

This application is based on and incorporates herein by reference Japanese Patent Application No. 2004-222873 filed on Jul. 30, 2004 and Japanese Patent Application No. 2005-119689 filed on Apr. 18, 2005.

BACKGROUND OF THE INVENTION

1. Field of the Invention

The present invention relates to an exhaust gas cleaning device of an internal combustion engine, which has a particulate filter for capturing particulate matter contained in exhaust gas exhausted from the internal combustion engine.

2. Description of Related Art

One previously proposed exhaust gas cleaning device of an internal combustion engine provided in, for example, a vehicle, has a particulate filter, which is arranged in an exhaust gas passage of the internal combustion engine to capture particulate matter contained in exhaust gas exhausted from the internal combustion engine.

In the particulate filter, supplied exhaust gas is passed through porous walls. At this time, the particulate matter contained in the exhaust gas is captured by surfaces and minute holes of the porous walls. When the amount of accumulated particulate matter in the particulate filter becomes excessive, flow resistance in the particulate filter increases. This causes an increase in a back pressure of the internal combustion engine to cause a decrease in an output power of the engine. Thus, in such a case, the particulate filter needs to be regenerated by removing the accumulated particulate matter from the particulate filter and thereby recovering the exhaust gas flow conducting performance of the particulate filter. In general, a state of accumulation of the particulate matter in the particulate filter is monitored. When the amount of accumulated particulate matter in the particulate filter exceeds a predetermined value, the temperature of the particulate filter is increased by, for example, post fuel injection to combust the accumulated particulate matter and thereby to forcefully regenerate the particulate filter.

The amount of exhausted particulate matter, which is exhausted from the internal combustion engine, is regarded as the amount of collected particulate matter, which is collected by the particulate filter. This amount of collected particulate matter is cumulated to obtain a current estimated value of the amount of accumulated particulate matter. At this time, as recited in Japanese Unexamined Patent Publication No. 1-318715 (corresponding to U.S. Pat. No. 4,902,487), the particulate matter, which is accumulated in the particulate filter, is combusted (oxidized) at a relatively low temperature with aid of NOx contained in the exhaust gas. Thus, when the amount of accumulated particulate matter needs to be estimated with a relatively high precision, a decrease in the amount of accumulated particulate matter, which is caused by the oxidizing reaction, needs to be considered.

For example, according to Japanese Unexamined Patent Publication Number 2001-280118, the particulate filter is regenerated by the oxidizing reaction of the accumulated particulate mater with NOx. In this case, there is computed a difference between an estimated value of the amount of exhausted particulate matter, which is estimated based on an operational state of the internal combustion engine, and an estimated value of the amount of combusted particulate matter, which is estimated based on the temperature of exhaust gas that passes through the particulate filter. Then, this difference is cumulated to obtain a corresponding current estimated value of the amount of accumulated particulate matter.

Japanese Unexamined Patent Publication No. 1-318715 and Japanese Unexamined Patent Publication Number 2001-280118 recite the methods of continuously regenerating the particulate filter through the oxidizing reaction of the accumulated particulate matter with the NOx contained in the exhaust gas, which is supplied to the particulate filter. In the continuous regeneration, normally, a catalyst is positioned in an upstream part of the particulate filter to promote the oxidizing reaction of the accumulated particulate matter with the NOx. However, in the particulate filter of the typical forceful regeneration type, the accumulated particulate matter is also removed through the oxidizing reaction of the accumulated particulate matter with the NOx contained in the exhaust gas, which is supplied to the particulate filter. Furthermore, in the patent document 2, the typical forceful regeneration type is used in view of the fact that the oxidizing reaction between the exhausted particulate matter and NOx does not proceeds sufficiently when the temperature is too low. Thus, when the computed value of the amount of accumulated particulate matter exceeds the predetermined value, the temperature of the exhaust gas is forcefully increased to remove the accumulated particulate matter.

However, at the time of computing the current amount of accumulated particulate matter, when the current amount of accumulated particulate matter is computed upon consideration of only the oxidizing reaction of NOx as recited in Japanese Unexamined Patent Publication No. 1-318715, a value of the amount of combusted particulate matter could be possibly underestimated, so that an accuracy of an estimated value of the amount of accumulated particulate matter may be deteriorated. In Japanese Unexamined Patent Publication No. 1-318715, there is recited only the oxidizing reaction of the particulate matter with NOx contained in the exhaust gas, which is supplied to the particulate filter. However, in reality, a portion of NOx contained in the exhaust gas, which is previously supplied to the particulate filter, is adsorbed in the accumulated particulate matter. The accumulated particulate matter is reduced through the reaction of the accumulated particulate matter with the portion of NOx, which is adsorbed in the accumulated particulate matter. This is the reason for deteriorating the accuracy of the estimated value of the amount of accumulated particulate matter. Because of this, the estimated value of the amount of accumulated particulate matter becomes greater than the actual value of the amount of accumulated particulate matter. As a result, a frequency of regeneration of the particulate filter is increased, and fuel consumption is significantly deteriorated.

As described above, the prior art method is not sufficiently accurate for monitoring the combustion state of the accumulated particulate matter, and therefore the amount of accumulated particulate matter cannot be correctly measured.

SUMMARY OF THE INVENTION

The present invention addresses the above disadvantage. Thus, it is an objective of the present invention to provide an exhaust gas cleaning device of an internal combustion engine, by which oxidizing reaction of accumulated particulate matter in a particulate filter can be more accurately estimated.

To achieve the objective of the present invention, there is provided an exhaust gas cleaning device for an internal combustion engine. The exhaust gas cleaning device includes a particulate filter, a regenerating means and an accumulated amount estimating means. The particulate filter is arranged in an exhaust gas passage of the engine to collect particulate matter contained in exhaust gas, which is exhausted from the engine. The regenerating means is for regenerating the particulate filter based on an amount of accumulated particulate matter, which is accumulated in the particulate filter. The regenerating means at least uses an oxidizing reaction of the accumulated particulate matter with NOx, which is supplied along with the exhaust gas, to regenerate the particulate filter. The accumulated amount estimating means for estimating the amount of accumulated particulate matter in the particulate filter based on an amount of increased particulate matter that is increased in the particulate filter by exhaustion of the exhaust gas from the engine, and an amount of reduced particulate matter that is reduced in the particulate filter through the oxidizing reaction of the accumulated particulate matter with the NOx. The accumulated amount estimating means includes a reduced amount computing means for computing the amount of reduced particulate matter, which is reduced through the oxidizing reaction of the accumulated particulate matter with the NOx, based on a first sub-amount of reduced particulate matter, which is an amount of reduced particulate matter that is reduced from the particulate filter through oxidizing reaction of the particulate matter with a non-adsorbed group of the NOx, which is present in a surrounding atmosphere that surrounds the accumulate particulate matter, and a second sub-amount of reduced particulate matter, which is an amount of reduced particulate matter that is reduced from the particulate filter through oxidizing reaction of the particulate matter with an adsorbed group of the NOx, which is supplied to the particulate filter along with the exhaust gas and is adsorbed by the accumulated particulate matter.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
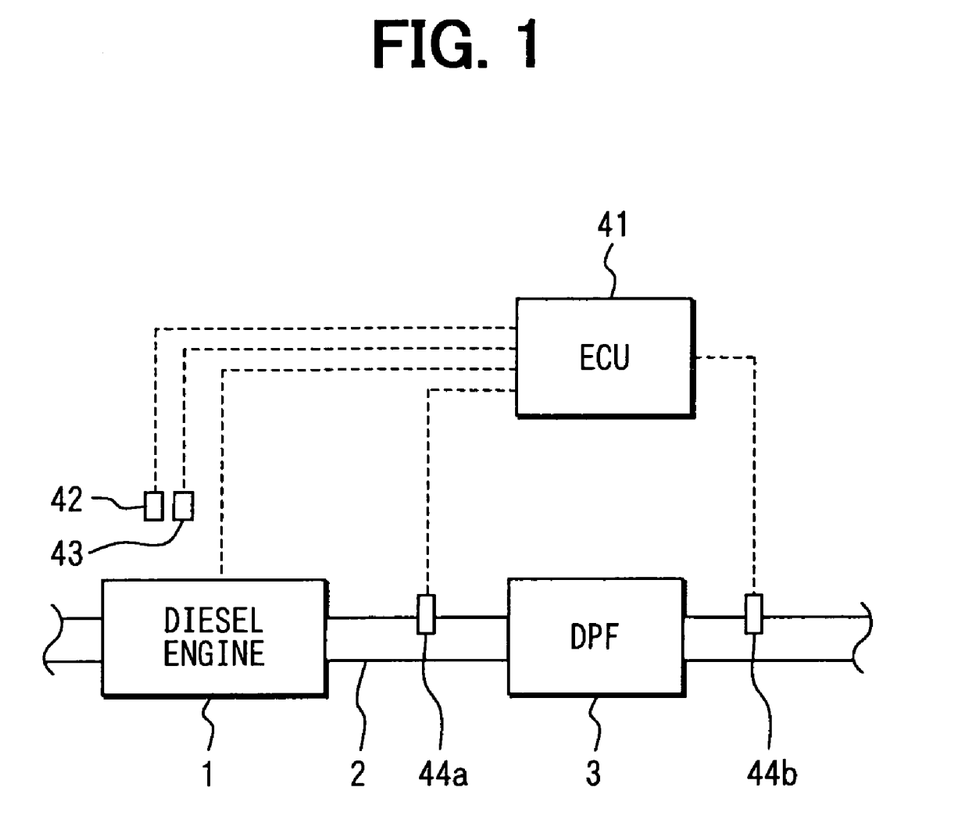
FIG. 1 is a schematic view showing an exhaust gas cleaning device of an internal combustion engine according to a first embodiment of the present invention.

FIG. 1 shows an exhaust gas cleaning device of an internal combustion engine according to a first embodiment of the present invention. In the following description, it is assumed that a diesel engine (hereinafter, simply referred to as an engine) 1, which serves as the internal combustion engine of the present invention, is installed in a vehicle to serve as a drive source. A particulate filter (hereinafter, also simply abbreviated as DPF) 3 is provided in an exhaust gas passage 2, which conducts exhaust gas discharged from exhaust ports of the engine 1.

The DPF 3 includes a honeycomb structure of refractory ceramics (e.g., cordierite). Cells of the honeycomb structure, which form a gas flow passage, are alternately closed, so that inlets and outlets of the cells are alternately arranged. Furthermore, oxidation catalyst (e.g., platinum catalyst) is coated on wall surfaces of the cells. The exhaust gas, which passes the exhaust gas passage 2, flows downward through the porous partition walls of the DPF 3, and particulate matter (PM) is captured by and is accumulated on the partition walls.

Two exhaust gas temperature sensors 44a, 44b are provided in the exhaust gas passage 2 on an upstream side and a downstream side, respectively, of the DPF 3 and output measurement signals to an ECU 41. The temperature in the interior of the DPF 3 (hereinafter, also simply referred to as the DPF temperature) is obtained through the exhaust gas temperature sensors 44a, 44b. Here, the temperature is measured at the two locations to improve the measurement accuracy, and the DPF temperature is obtained through averaging and/or filtering of the measured temperature values of the exhaust gas temperature sensors 44a, 44b.

Furthermore, the ECU 41 is also connected to other sensors, such as an engine rotational speed sensor 42, an accelerator opening degree sensor 43 and/or other undepicted sensors, which are generally used in the contemporary diesel engine. Here, the engine rotational speed sensor 42 measures an engine rotational speed, and the accelerator opening degree sensor 43 measures an opening degree of an accelerator valve. An operational state of the engine 1 and an operational state of the DPF 3 are sensed based on the output signals of the sensors.

The ECU 41 includes a microcomputer as its core component. The ECU 41 controls the states of the relevant parts of the engine 1 based on the output signals of the sensors and determines the fuel injection amount and fuel injection timing of the engine 1 based on the states of the corresponding parts of the engine 1. Furthermore, the ECU 41 monitors a state of accumulation of the PM in the DPF 3 and determines whether it is the time for forcefully regenerating the DPF 3. The forceful regeneration of the DPF 3 is performed through a known method, such as post fuel injection.

Figure 2:
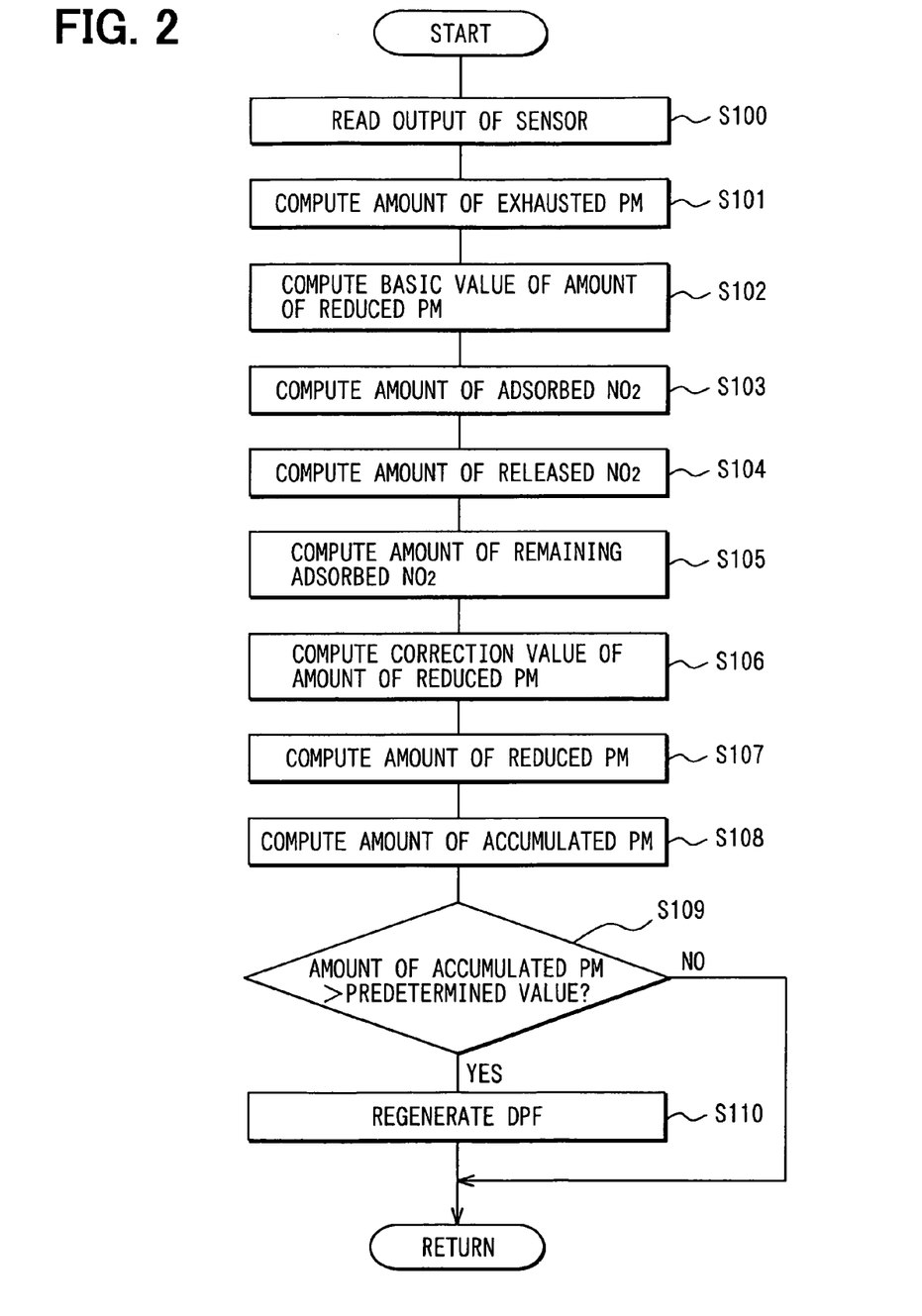
FIG. 2 is a flowchart showing a control operation executed in an ECU of the exhaust gas cleaning device.
Figure 3:
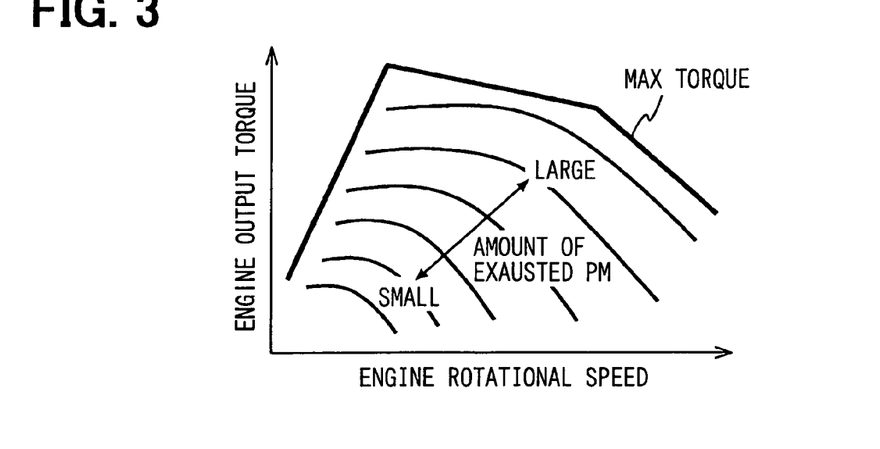
FIG. 3 is a first graph for describing the control operation executed in the ECU.

FIG. 2 shows a flowchart that indicates a computation process of the ECU 41 for computing the amount of accumulated PM. The computation process shown in the flowchart is executed at predetermined control intervals (e.g., every one second) through, for example, timer interruption. At step S100, an output of each corresponding sensor is read by the ECU 41. At step S101, the amount of PM (exhausted PM), which is exhausted from the engine 1, is computed. The amount of exhausted PM is defined as the amount of PM, which is exhausted from the engine 1 per control interval. FIG. 3 shows a relationship between the engine rotational speed and the engine output torque. Here, the amount of exhausted PM increases when at least one of the engine rotational speed and the engine output torque increases. In the exhaust gas cleaning device of the present embodiment, an exhausted PM amount map, which indicates the amount of exhausted PM with respect to the outputs of the engine rotational speed sensor and of the accelerator opening degree sensor, is prepared based on data obtained in advance thorough experiments and is stored in a memory of the ECU 41. The exhausted PM amount map is set such that the amount of exhausted PM increases upon increasing of the engine rotational speed and/or the accelerator opening degree. The amount of exhausted PM is computed with reference to the exhausted PM amount map. Furthermore, the amount of exhausted PM varies depending on an acceleration state of the engine 1 and/or conditions of a surrounding environment. Thus, the amount of exhausted PM may be corrected based on a change of the accelerator opening degree, the outside temperature and/or the atmospheric pressure.

The amount of accumulated PM is used to know the amount of increased PM caused by the discharge of the PM from the engine 1. In this instance, it is assumed that the PM, which is discharged from the engine 1, is entirely accumulated in the DPF 3 (i.e., the amount of accumulated PM=the amount of increased PM in the DPF 3). Furthermore, a particulate filtering efficiency of the DPF 3 may be used as a coefficient, which is multiplied by the amount of exhausted PM to obtain a more accurate value of the amount of increased PM.

In the present step, the total amount of exhausted PM is cumulated. More specifically, the currently measured value of the amount of exhausted PM is added to the previous value of the total amount of exhausted PM to renew the value of the total amount of exhausted PM.

Step S102 serves as a reduced PM amount basic value computing means for computing a basic value of the amount of reduced PM. The basic value of the amount of reduced PM is the amount of the PM, which is reduced through reaction with the exhaust gas. The basic value of the amount of reduced PM is obtained by cumulating a basic value of a PM decreasing speed (amount of reduced PM per unit time), i.e., a PM oxidizing speed (amount of oxidized PM per unit time), which is caused by the reaction of the PM with the exhaust gas, at each measurement time. Specifically, the basic value of the amount of reduced PM is obtained by adding the current value of the PM oxidizing speed to the previous basic value of the amount of reduced PM to renew the basic value of the amount of reduced PM. A basic value of a PM combusting speed is standardized as the amount of reduced PM caused by the oxidizing reaction of the PM per control interval, which serves as a unit time. In the following description, the basic value of the PM oxidizing speed will be simply referred to as the PM oxidizing speed. A PM oxidizing speed map for obtaining the PM oxidizing speed is stored in the memory of the ECU 41. The PM oxidizing speed map is a map, which indicates the PM oxidizing speed relative to the various conditions, such as the DPF temperature, the $NO_2$ concentration in the exhaust gas of the engine 1. In the PM oxidizing speed map, the $NO_2$ concentration in the exhaust gas is taken into account as an influencing factor, which has a substantial influence on the PM oxidizing speed.

However, multiple species, which include $NO_2$, are contained as NOx (nitrogen oxides) in the exhaust gas of the diesel engine. In the present embodiment, although $NO_2$, which shows the high reactivity and aids in the oxidation of the PM, is described as the exemplary NOx, which aids in the oxidation of the PM, the present invention is not limited to $NO_2$. Thus, any appropriate NOx, which can aid in the oxidation of the PM, can be used in place of or in addition to $NO_2$.

Figure 4:
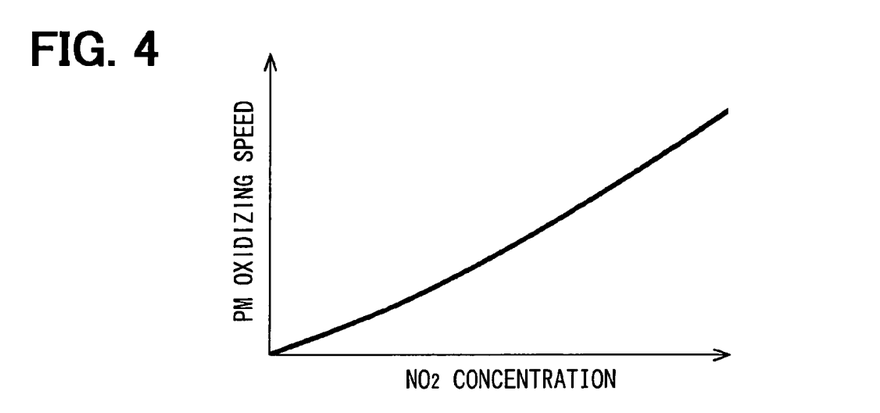
FIG. 4 is a second graph for describing the control operation executed in the ECU.

The PM oxidizing speed map is prepared based on data obtained in advance through experiments. The PM oxidizing speed map is set such that the PM oxidizing speed increases upon increase of the DPF temperature. As shown in FIG. 4, the PM oxidizing speed increases when the concentration of $NO_2$, which reacts with the PM, increases. The PM oxidizing speed map is set such that the PM oxidizing speed increases when the concentration of $NO_2$ increases.

It should be noted that the PM oxidizing speed is computed based on other known PM oxidizing speed influencing factors, such as the oxygen concentration in the exhaust gas and/or the amount of accumulated PM, other than the DPF temperature and the $NO_2$ concentration.

The $NO_2$ concentration is computed according to an $NO_2$ concentration map, in which the $NO_2$ concentration corresponds to the operational state of the engine 1. The $NO_2$ concentration map is also prepared based on data obtained in advance through experiments.

Figure 5:
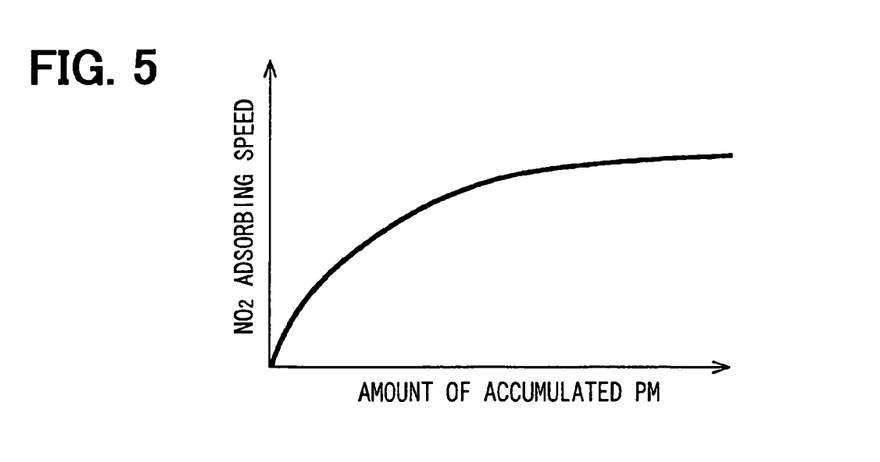
FIG. 5 is a third graph for describing the control operation executed in the ECU.

Steps S103, S104 correspond to an NOx adsorbing and releasing history sensing means that is implemented along with the exhaust gas temperature sensors 44a, 44b. At step S103, the amount of adsorbed $NO_2$, which is adsorbed by the accumulated PM of the DPF 3, is computed. The amount of adsorbed $NO_2$ is computed by cumulating an $NO_2$ adsorbing speed (amount of adsorbed $NO_2$ per unit time) obtained at each measurement time. Specifically, the amount of adsorbed $NO_2$ is obtained through renewing the amount of adsorbed $NO_2$ by adding the current $NO_2$ adsorbing speed to the previous computed value of the amount of adsorbed $NO_2$. The $NO_2$ adsorbing speed is standardized as the amount of adsorbed $NO_2$ per unit time, which is equal to the above-described control interval. Thus, the $NO_2$ adsorbing speed corresponds to the amount of adsorbed $NO_2$ per control interval. An $NO_2$ adsorbing speed map, which is used to obtain the $NO_2$ adsorbing speed, is stored in the memory of the ECU 41. The $NO_2$ adsorbing speed map is obtained by computing the $NO_2$ adsorbing speed under various conditions in advance and includes the amount of accumulated PM as a parameter. As shown in FIG. 5, the $NO_2$ adsorbing speed increases when the amount of accumulated PM increases. Thus, according to the $NO_2$ adsorbing speed map, the $NO_2$ adsorbing speed increases when the amount of accumulated PM increases. Furthermore, in the $NO_2$ adsorbing speed map, in addition to the amount of accumulated PM, the DPF temperature is used as a parameter. According to the $NO_2$ adsorbing speed map, the $NO_2$ adsorbing speed increases when the DPF temperature increases.

Here, it should be noted that the previous value of the amount of accumulated PM is used as the amount of accumulated PM, which is used to obtain the $NO_2$ adsorbing speed.

At step S104, the amount of released $NO_2$, which is released from the accumulated PM of the DPF 3, is computed. The amount of released $NO_2$ is obtained by cumulating an $NO_2$ releasing speed (amount of released $NO_2$ per unit time) obtained at each measurement time. Specifically, the amount of released $NO_2$ is obtained through renewing the amount of released $NO_2$ by adding the current $NO_2$ releasing speed to the previous value of the amount of released $NO_2$. The $NO_2$ releasing speed is standardized as the amount of released $NO_2$ per unit time, which is equal to the above-described control interval. Thus, the $NO_2$ releasing speed corresponds to the amount of released $NO_2$ per control interval. An $NO_2$ releasing speed map, which is used to obtain the $NO_2$ releasing speed, is stored in the memory of the ECU 41. The $NO_2$ releasing speed map is obtained by computing the $NO_2$ releasing speed in advance under various conditions. For example, the DPF temperature is used as a parameter in the $NO_2$ releasing speed map. According to the $NO_2$ releasing speed map, the $NO_2$ releasing speed increases when the DPF temperature increases.

Together with step S102, steps S105 to S107 correspond to a reduced amount computing means and computes the amount of reduced PM, which is reduced through the oxidizing reaction with the $NO_2$ that remains in the PM according to the adsorbing and releasing history of $NO_2$. At step S105, the amount of released $NO_2$, which is computed at step S104, is subtracted from the amount of adsorbed $NO_2$, which is computed at step S103, to obtain a difference therebetween, and this difference is used as the amount of remaining adsorbed $NO_2$.

Figure 6:
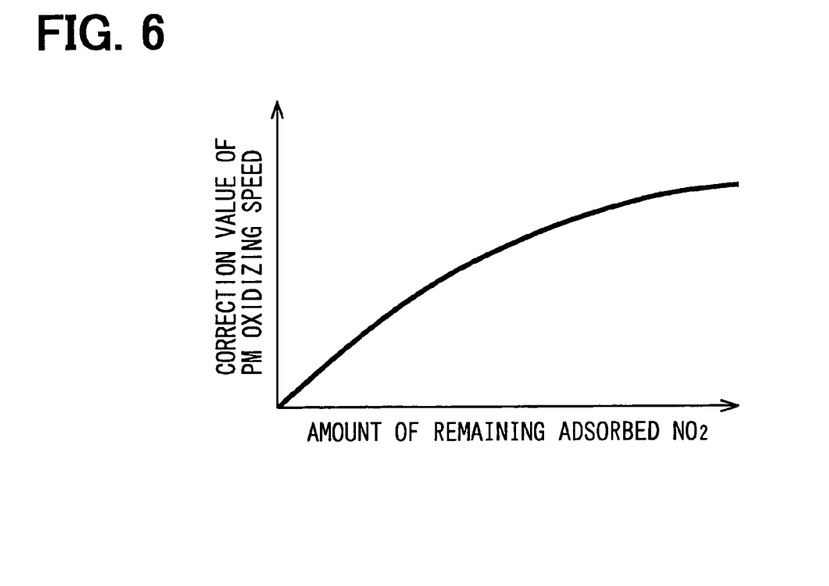
FIG. 6 is a fourth graph for describing the control operation executed in the ECU.

Step S106 corresponds to a reduced PM amount correction value computing means for computing a correction value of the amount of reduced PM based on the amount of remaining adsorbed $NO_2$, which is computed at step S105. A reduced PM amount correction value map for obtaining the correction value of the amount of reduced PM is stored in the memory of the ECU 41. In the reduced PM amount correction value map, as shown in FIG. 6, the amount of remaining adsorbed $NO_2$ is used as a parameter. In the reduced PM amount correction value map, the correction value of the amount of reduced PM increases when the amount of remaining adsorbed $NO_2$ increases. This is due to the following reason. That is, $NO_2$, which is adsorbed by the accumulated PM, initiates a combustion reaction with the accumulated PM. Thus, the PM oxidizing speed is increased according to the amount of remaining adsorbed $NO_2$.

Step S107 serves as the reduced PM amount correction value computing means. At step S107, the correction value of the amount of reduced PM, which is computed at step S106, is added to the basic value of the amount of reduced PM, which is computed at step S102. In this way, a sum of the correction value of the amount of reduced PM and the basic value of the amount of reduced PM is obtained and is then used as the amount of reduced PM. The basic value of the amount of reduced PM, which is obtained without considering the oxidizing reaction caused by the adsorbed N02 that is adsorbed by the accumulated PM, is corrected upon consideration of the oxidizing reaction caused by the adsorbed $NO_2$ that is adsorbed by the accumulated PM. Thus, the amount of reduced PM can be obtained with a relatively high accuracy.

At step S108, the amount of reduced PM, which is computed at step S107, is subtracted from the total amount of exhausted PM, which is computed at step S101 to obtain a difference therebetween, and this difference is defined as oxidizing reaction of accumulated PM in the DPF 3.

At step S109, it is determined whether the amount of accumulated PM, which is computed at step S108, has reached a predetermined value. The predetermined value is the amount of accumulated PM, at or above which forceful regeneration of the DPF 3 is required. The predetermined value is set upon consideration of a possibility of an increase in the pressure loss of the DPF 3 and/or a possibility of a damage of the DPF 3 caused by rapid combustion of the PM at the time of regenerating the DPF 3 or at the time of decelerating the vehicle.

When the amount of accumulated PM is below the predetermined value, and therefore NO is returned at step S109, control proceeds to "RETURN" to repeat the above steps. In contrast, when YES is returned at step S109, control proceeds to step S110 where the regeneration of the DPF 3 is performed, i.e., the forceful regeneration of the DPF 3 by, for example, post fuel injection is performed, and control proceeds to "RETURN".

In the above description, the correction value of the amount of reduced PM is described as the correction value added to the basic value of the amount of reduced PM. Alternatively, the correction value of the amount of reduced PM may be a correction coefficient, which is multiplied to the basic value of the amount of reduced PM.

Figure 7:
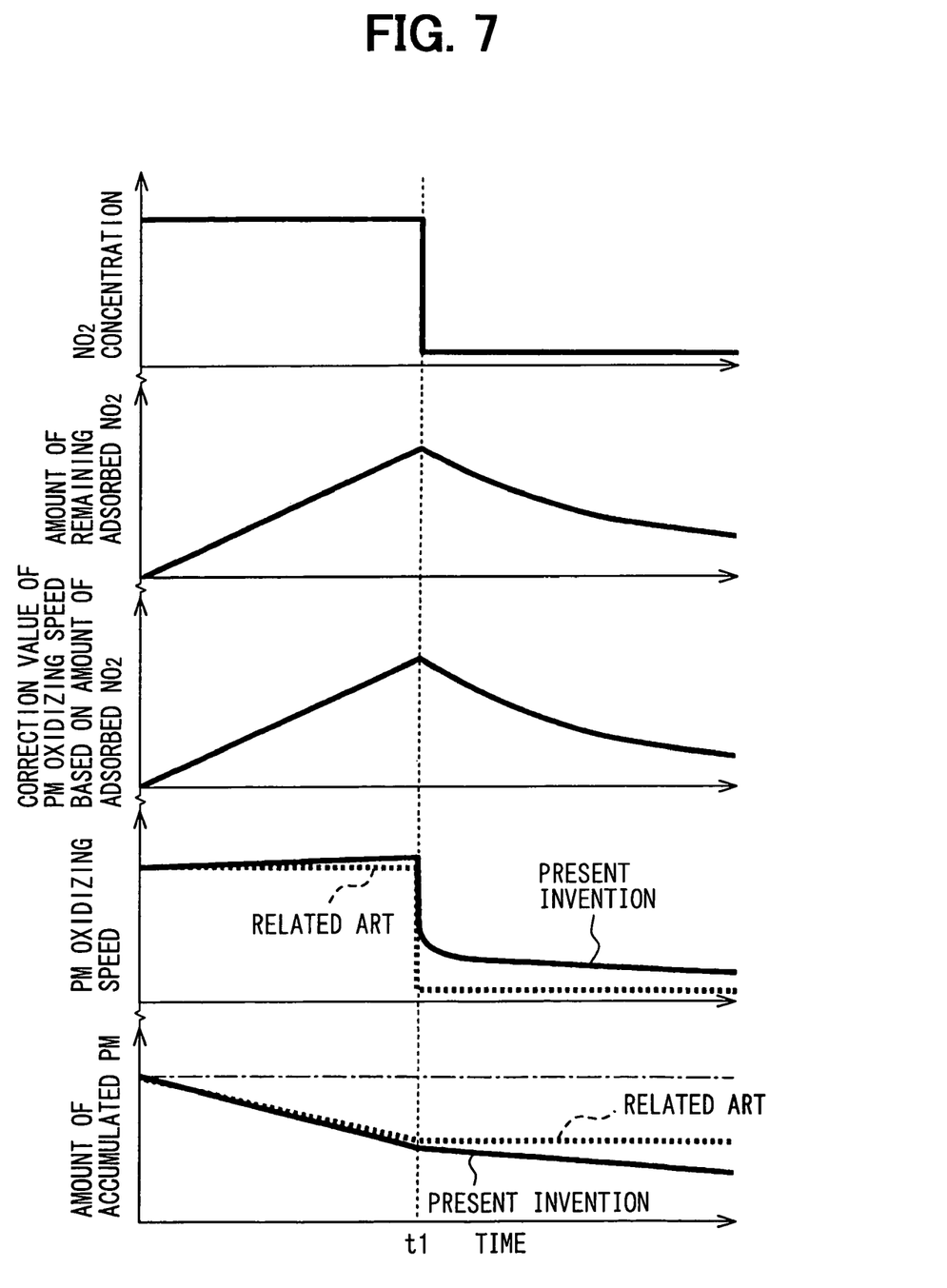
FIG. 7 is a timing chart for describing operational differences between the exhaust gas cleaning device of the first embodiment and that of a related art device.

Operation of the present embodiment will be described with reference to FIG. 7. In addition to the above embodiment, FIG. 7 also shows a related art, in which the combustion caused by the adsorbed $NO_2$ that is adsorbed by the accumulated PM is not concerned in the process of obtaining the PM oxidizing speed. FIG. 7 shows a case where the $NO_2$ concentration in the exhaust gas decreases in a stepped manner at time t1. Here, a change in the estimated value of the PM oxidizing speed with respect to the time according to the present embodiment is compared with a change in the estimated value of the PM oxidizing speed with respect to the time according to the prior art. Also, a change in the amount of accumulated PM with respect to the time according to the present embodiment is compared with a change in the amount of accumulated PM with respect to the time according to the related art. In the state where high $NO_2$ concentration in the exhaust gas exists before the time t1, the $NO_2$ adsorbing speed is above the $NO_2$ releasing speed, so that the amount of remaining adsorbed $NO_2$ gradually increases. After the time t1, the $NO_2$ releasing speed becomes greater than the $NO_2$ adsorbing speed, so that the amount of remaining adsorbed $NO_2$ gradually decreases. In the present embodiment, the correction value of the PM oxidizing speed is provided to have a profile that is similar to that of the amount of remaining adsorbed $NO_2$.

In the estimation of the PM oxidizing speed according to the related art, the combustion of the PM caused by the $NO_2$ in the exhaust gas is not concerned. Thus, the profile of the change in the PM oxidizing speed according to the related art is similar to that of the change in the $NO_2$ concentration. In contrast, according to the present embodiment, the contribution of $NO_2$, which is adsorbed by the accumulated PM, is concerned. Thus, according to the present embodiment, the PM oxidizing speed gradually increased before the elapse of the time t1. However, after the elapse of the time t1, the decrease in the PM oxidizing speed according to the present embodiment is less than that of the related art although the $NO_2$ concentration in the exhaust gas is relatively low. The estimated amount of accumulated PM according to the present embodiment is less than the estimated amount of accumulated PM according to the related art because of the increase in the PM oxidizing speed caused by the adsorbed $NO_2$, which is adsorbed by the accumulated PM, in the present embodiment. A difference between the estimated amount of accumulated PM according to the present embodiment and the estimated amount of accumulated PM according to the related art becomes more significant in the period after the elapse of the time t1 where the $NO_2$ concentration in the exhaust gas decreases, and a ratio of the adsorbed $NO_2$ in the total amount of contributing $NO_2$, which contributes to the oxidizing of the PM, increases.

When a first group of the supplied $NO_2$ (non-adsorbed group of NOx), which is supplied to the DPF 3 and is thus present in the surrounding atmosphere around the accumulated PM, contacts the accumulated PM, the first group of the supplied $NO_2$ substantially, immediately reacts with the accumulated PM with a small reaction time lag (hereinafter, referred to as a first reaction time lag). The amount of reduced PM, which is reduced by this oxidizing reaction corresponds to the first sub-amount of reduced particulate matter. In contrast, when a second group of the supplied $NO_2$, which is supplied to the DPF 3, contacts the accumulated PM, the second group of the supplied $NO_2$ is adsorbed by the accumulated PM and is thus placed in the adsorbed state. Thus, when the second group of the supplied $NO_2$ (adsorbed group of NOx) contacts the accumulated PM, the second group of the supplied $NO_2$ reacts with the accumulated PM with a longer time lag (hereinafter, referred to as a second reaction time lag), which is longer than the first reaction time lag. The behavior of the second group of the supplied $NO_2$ is explicitly shown in the time period after the elapse of the time t1, during which the PM is oxidized and is removed while consuming the adsorbed $NO_2$ that is adsorbed by the accumulated PM. The amount of reduced PM, which is reduced by this oxidizing reaction corresponds to the second sub-amount of reduced particulate matter. The first reaction time lag is about 10 seconds, and the second reaction time lag is about 1 minute.

As described above, according to the present embodiment, the computation is upon consideration of the actual PM oxidizing reaction in the DPF 3, in which the PM is combusted while consuming the adsorbed $NO_2$ that is adsorbed by the accumulated PM. Thus, the accuracy in the estimation of the amount of accumulated PM is improved in comparison to the related art. In this way, the DPF 3 can be forcefully regenerated at the appropriate timing.

In the present embodiment, the computation of, for example, the amount of exhausted PM or of the amount of reduced PM is performed at predetermined control intervals (e.g., every 1 second interval), and each corresponding value is renewed synchronously. Alternatively, for example, the amount of exhausted PM or the amount of reduced PM, which is measured in a predetermined time period (e.g., a period of 1 second), may be averaged to obtain an average value, and each corresponding value may be computed based on the average value.

Second Embodiment

Figure 8:
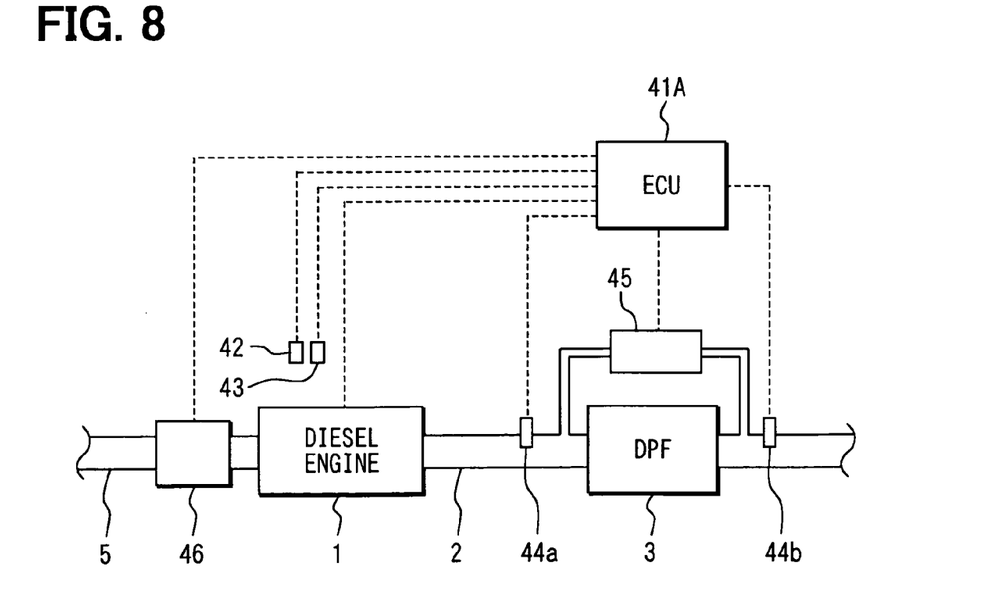
FIG. 8 is a schematic view showing an exhaust gas cleaning device of an internal combustion engine according to a second embodiment of the present invention.

FIG. 8 shows a second embodiment of the present invention. The structure according to the second embodiment is similar to that of the first embodiment except some differences. Thus, in the following description, the differences between the first embodiment and the second embodiment will be mainly described. A differential pressure sensor 45 is connected to the exhaust gas passage 2 to measure a pressure difference between the upstream side and the downstream side of the DPF 3 and to output a measurement signal to an ECU 41A. The pressure difference is used to compute the amount of accumulated PM. More specifically, the amount of accumulated PM is computed based on the pressure difference and an output signal of an air flow meter 46, which is provided in an air intake passage 5.

Figure 9:
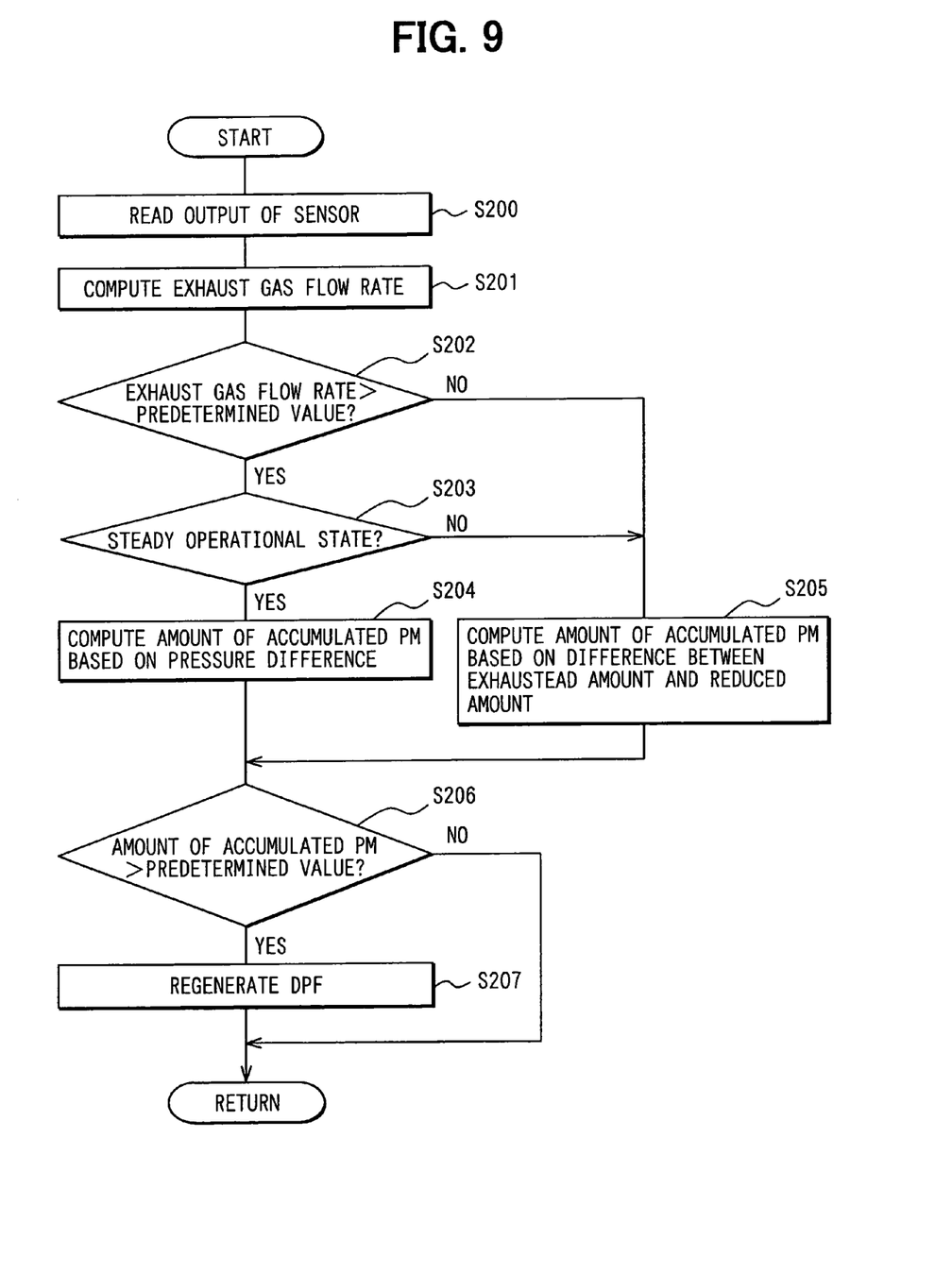
FIG. 9 is a flowchart showing a control operation executed in an ECU of the exhaust gas cleaning device of the second embodiment.

FIG. 9 shows a computing process of the ECU 41A for computing the amount of accumulated PM. At step S200, the output of each corresponding sensor is read. At step S201, an exhaust gas flow rate is computed.

At step S202, it is determined whether the exhaust gas flow rate, which is computed at step S201, exceeds a predetermined value. When YES is returned at step S202, control proceeds to step S203. At step S203, it is determined whether the engine is in a steady operational state. Whether the engine is in the steady operational state is determined based on a degree of a change in, for example, the engine rotational speed or the accelerator opening degree. When the change is equal to or less than a predetermined value, it is determined that the engine is in the steady operational sate. When YES is returned at step S203, control proceeds to step S204. When NO is returned at step S203, control proceeds to step S205.

When it is determined that the engine is in the steady operational state, and the exhaust gas flow rate exceeds the predetermined value, step S204 is executed, as described above. At step S204, the amount of accumulated PM is computed based on the pressure difference between the upstream side and the downstream side of the DPF 3 and the exhaust gas flow rate in the DPF 3. The PM, which is accumulated in the DPF 3, causes an increase in the pressure difference. When the exhaust gas flow rate increases, the pressure difference increases. An accumulated PM amount map, which shows the amount of accumulated PM with respect to the pressure difference and the exhaust gas flow rate, is prepared in advance based on data obtained through experiments and is stored in the memory of the ECU 41. The exhaust gas flow rate is computed based on the amount of intake air, which is measured with the air flow meter 46, and/or the DPF temperature, which is measured with the exhaust gas temperature sensors 44a, 44b.

At step S205, which is executed when NO is returned at step S202 or S203, an increase in the amount of accumulated PM is computed by subtracting the amount of reduced PM from the amount of exhausted PM to obtain the difference therebetween, and then cumulating the difference each time, like in the first embodiment. Based on this cumulated value, the amount of accumulated PM is computed. More specifically, the increase in the accumulated PM is added to the last computed value of the amount of accumulated PM, which is obtained at step S204 based on the pressure difference and the exhaust gas flow rate. Specifically, in a specific period, during which NO is returned in one of steps S202, S203, and during which the engine is not in the steady operational state, or the exhaust gas flow rate is relatively low, an increase in the amount of accumulated PM during this specific period is computed based on the amount of exhausted PM and the amount of reduced PM. When the engine 1 is not in the steady operational state, or when the exhaust gas flow rate is relatively small, the computation of the amount of accumulated PM based on the pressure difference and the exhaust gas flow rate tends to exhibit a relatively large error in comparison to the computation of the amount of accumulated PM based on the difference between the amount of exhausted PM and the amount of reduced PM. Because of this, in the present embodiment, one of the above-described two types of computations is selectable to limit occurrence of a decrease in the accuracy of the computed value of the amount of accumulated PM.

The amount of reduced PM is computed at step S205 based on the $NO_2$ adsorbing and releasing history, which indicates the history of adsorbing and releasing of the $NO_2$ relative to PM, like at steps S102 to S107 of the first embodiment. Here, it should be noted that the $NO_2$ adsorbing and releasing history is computed in both of the following cases, i.e., the case of computing the amount of accumulated PM based on the pressure difference and the exhaust gas flow rate and the case of computing the amount of accumulated PM by subtracting the amount of reduced PM from the amount of exhausted PM to provide a difference therebetween and then cumulating the difference each time. The above $NO_2$ adsorbing and releasing history is always computed and is used in the computation of the amount of reduced PM in the latter case.

It should be noted that the present invention is not limited to the above embodiments and can be implemented in various ways without departing the scope of the invention.

Additional advantages and modifications will readily occur to those skilled in the art. The invention in its broader terms is therefore not limited to the above specific details.

What is claimed is:

1. An exhaust gas cleaning device for an internal combustion engine, the exhaust gas cleaning device comprising:
    a particulate filter that is arranged in an exhaust gas passage of the engine to collect particulate matter contained in exhaust gas, which is exhausted from the engine;
    a regenerating means for regenerating the particulate filter based on an amount of accumulated particulate matter, which is accumulated in the particulate filter, wherein the regenerating means at least uses an oxidizing reaction of the accumulated particulate matter with NOx, which is supplied along with the exhaust gas, to regenerate the particulate filter; and
    an accumulated amount estimating means for estimating the amount of accumulated particulate matter in the particulate filter based on:
        an amount of increased particulate matter that is increased in the particulate filter by exhaustion of the exhaust gas from the engine; and
        an amount of reduced particulate matter that is reduced in the particulate filter through the oxidizing reaction of the accumulated particulate matter with the NOx, wherein the accumulated amount estimating means includes a reduced amount computing means for computing the amount of reduced particulate matter, which is reduced through the oxidizing reaction of the accumulated particulate matter with the NOx, based on:
    a first sub-amount of reduced particulate matter, which is an amount of reduced particulate matter that is reduced from the particulate filter through oxidizing reaction of the particulate matter with a non-adsorbed group of the NOx, which is present in a surrounding atmosphere that surrounds the accumulate particulate matter; and
    a second sub-amount of reduced particulate matter, which is an amount of reduced particulate matter that is reduced from the particulate filter through oxidizing reaction of the particulate matter with an adsorbed group of the NOx, which is supplied to the particulate filter along with the exhaust gas and is adsorbed by the accumulated particulate matter.

2. The exhaust gas cleaning device according to claim 1, wherein the reduced amount computing means includes:
    a reduced amount basic value computing means for computing a basic value of the amount of reduced particulate matter, which is reduced from the particulate filter through the oxidizing reaction of the particulate matter with the NOx, based on a concentration of the NOx present in the surrounding atmosphere, which surrounds the accumulated particulate matter;
    an NOx adsorbing and releasing history sensing means for sensing a history of adsorption of NOx to the accumulated particulate matter and release of NOx from the accumulated particulate matter; and
    a reduced amount correction value computing means for computing a correction value of the amount of reduced particulate matter, which is used to correct the basic value of the amount of accumulated particulate matter, based on NOx adsorbing and releasing history data, which has been sensed by the NOx adsorbing and releasing history sensing means.

3. The exhaust gas cleaning device according to claim 2, wherein:
    the NOx adsorbing and releasing history sensing means includes an NOx adsorbed amount and released amount computing means for computing:
        an amount of adsorbed NOx that is supplied to the particulate filter along with the exhaust gas and is adsorbed by the accumulated particulate matter; and
        an amount of released NOx that is released from the accumulated particulate matter;
    the reduced amount correction value computing means computes a total amount of adsorbed NOx, which is currently adsorbed in the accumulated particulate matter, based on the NOx adsorbing and releasing history data provided from the NOx adsorbed amount and released amount computing means; and
    the reduced amount correction value computing means computes the correction value of the amount of reduced particulate matter based on the total amount of adsorbed NOx.

* * * * *